United States Patent [19]
Kawasaki

[11] 4,112,338
[45] Sep. 5, 1978

[54] WIRING ARRANGEMENT FOR BLOWER MOTORS OF AN AIR CONDITIONER

[75] Inventor: Teruo Kawasaki, Yokohama, Japan

[73] Assignee: Nissan Motor Company, Limited, Japan

[21] Appl. No.: 738,572

[22] Filed: Nov. 3, 1976

[30] Foreign Application Priority Data
Nov. 19, 1975 [JP] Japan .................... 50-157114[U]

[51] Int. Cl.² ............................................. H02P 1/54
[52] U.S. Cl. ........................................ 318/59; 307/38; 165/27; 165/42
[58] Field of Search ................. 318/59, 102, 103; 307/115, 38; 165/42, 43, 27

[56] References Cited
U.S. PATENT DOCUMENTS

| | | | |
|---|---|---|---|
| 2,989,646 | 6/1961 | Vogt | 307/38 |
| 3,025,038 | 3/1962 | McDuffie | 165/27 |
| 3,367,408 | 2/1968 | Moreland | 165/27 |
| 3,785,433 | 1/1974 | Ballard | 165/27 |

Primary Examiner—Robert K. Schaefer
Assistant Examiner—John J. Feldhaus

[57] ABSTRACT

The running speeds of first and second electric motors can be controlled by a common voltage controller only by addition of an electromagnetic switch and a manual switch, the first and second motors being used for driving first and second blowers which are parts of an air heating device and an air cooling device, respectively.

11 Claims, 3 Drawing Figures

WIRING ARRANGEMENT FOR BLOWER MOTORS OF AN AIR CONDITIONER

The present invention relates in general to an air conditioner for a motor vehicle, and more particularly to an improved wiring arrangement of the control device for the air conditioner which has both an air heater and an air cooler.

Today, some new motor vehicles are produced with factory-installed air conditioners each including an air heating unit and an air cooling unit. In this case, the control devices of such air conditioners can be ideally and systematically designed with respect to the wiring arrangement.

However, some of the other motor vehicles are produced and installed with only the air heating devices (and in some cases, only the air cooling device). In such a case, when the vehicle originally equipped with the air heating device requires thereafter the installation of the air cooling device thereto, it requires complex installation and rewiring. For instance, the wiring of blower motors for the air heating device and the air cooling device usually require, because of their simplicity in wiring, the provision of two series of switch systems which are respectively and exclusively used for the air heating device and the air cooling device. As a result, the operator is subjected to troublesome switching operations in as much as it is possible to switch both on simultaneously and thus requires unnecessary additional concentration on behalf of the driver.

Therefore, the present invention is proposed to eliminate the above-mentioned drawbacks encountered in the conventional wiring arrangement between such two blower motors.

It is an object of the present invention to provide an improved and simple wiring arrangement which is used for selectively operating a blower motor for an air heating device and a blower motor for an air cooling device and which facilitates post production of a second heating or cooling device.

It is another object of the present invention to provide an improved wiring arrangement, for the unit of the air heating device and the air cooling device, in which electric resistors employed in the arrangement are prevented from being overheated.

It is still another object of the present invention to provide an air conditioner for a vehicle having an electric power source, comprising: a first electric motor for driving a first blower when energized, the first electric motor and the first blower being parts of an air heating device; a second electric motor for driving a second blower when energized, the second electric motor and the second blower being parts of an air cooling device; voltage controlling means for controlling the magnitude of electric current directed to the first and second motors from the electric power source so as to vary the running speeds of the first and second motors; and switching means having first and second states thereof, the first state being a state in which the first electric motor is electrically connected to the electric power source to be energized and simultaneously, the second electric motor is disconnected from the electric power source to be de-energized, the second state being a state in which the first electric motor is disconnected from the electric power source to be de-energized and simultaneously, the second electric motor is connected to the electric power source to be energized.

Other objects and advantages of the present invention will become more apparent from the following description when taken in conjunction with the accompanied drawings, in which.

Figure 1:
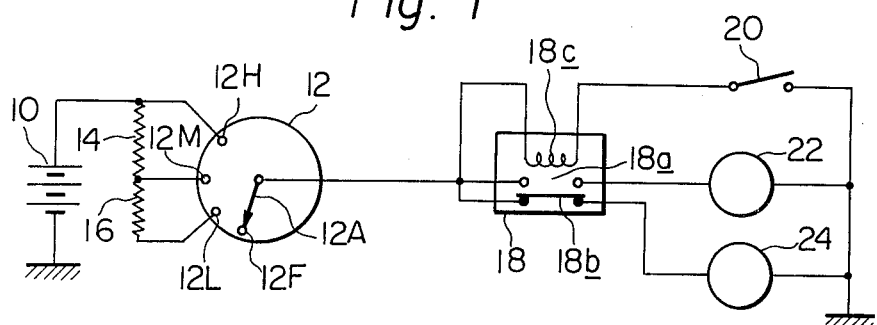
FIG. 1 is a first preferred embodiment of the present invention.

Referring to FIG. 1 of the drawings, there is shown a diagrammatical wiring arrangement according to the first embodiment of the invention. The arrangement has a battery 10 having a negative end grounded or connected to, for example, a chassis of a vehicle (not shown). A rotary switch 12 has first, second, third and fourth stationary contacts 12H, 12M, 12L and 12F, and a swingable arm or movable contact 12A which is electrically contactable with the stationary contacts upon rotation thereof. As shown, the first stationary contact 12H is connected to a positive end of the above-mentioned battery 10. Furthermore, a first resistor 14 and a second resistor 16 which are arranged in a series are disposed between the first stationary contact 12H and the third stationary contact 12L. The second stationary contact 12M is connected to a connection point (no numeral) between the two resistors 14 and 16, as shown. The fourth contact 12F is used only for supporting the swingable arm 14A upon contact therewith. An electromagnetic switch 18 having a normally open section 18a, a normally closed section 18b, and a solenoid coil 18c is communicated with the rotary switch 12 so that the respective one ends of 18a, 18b and 18c are connected to the swingable arm 12A, as shown. When the solenoid coil 18c is electrically energized, the normally open section 18a closes, and simultaneously the normally closed section 18b opens. The other ends of 18a, 18b and 18c are connected respectively through a manual switch 20, a first electric motor 22 and a second electric motor 24 to the chassis of the vehicle. The first motor 22 is used for driving a blower of an air cooling device (not shown), and the second motor 24 for a blower of an air heating device (not shown). These motors 22 and 24 may replace each other in this invention.

With this wiring arrangement, the operation is as follows.

When the manual switch 20 is open and simultaneously, the swingable arm 12A of the rotary switch 12 is brought into contact with one of the first, second and third stationary contacts 12H, 12M and 12L, the second motor 24 for the blower of the air heating device is energized.

In this condition, when the manual switch 20 is closed, the solenoid coil 18c of the electromagnetic switch 18 is energized to allow the normally open section 18a to close, and simultaneously, the normally closed section 18b to open. Thus, the first motor 22 for the blower of the air cooling device is energized, and the second motor 24 for the air heating device is de-energized. Although not shown nor described, the air cooling device proper and the air heating device proper are so arranged to start and stop their normal functions, respectively, when the manual switch 20 is closed. Furthermore, the running speed of each of the motors 22 and 24 is varied by selectively contacting the swingable arm 12A with the stationary contacts 12H, 12M and 12L. In this first embodiment, the contact of the swingable arm 12A with the first stationary contact 12H induces the highest rotational speeds of the motors 22 and 24.

From the above, it will be appreciated that, even if the vehicle originally installed with only the air heating device requires thereafter the installation of the air cooling device thereto, it can be done in a relatively simple so long as the above-mentioned improved wiring arrangement is installed during manufacture. More specifically speaking, the newly provided motor 22 for the air cooling device can be controlled by the originally installed single rotary switch 12 only by the addition of the electromagnetic switch 18 and the manual switch 20. Thus, an exclusive rotary switch for the newly provided motor 22 is not required in this case.

Figure 2:
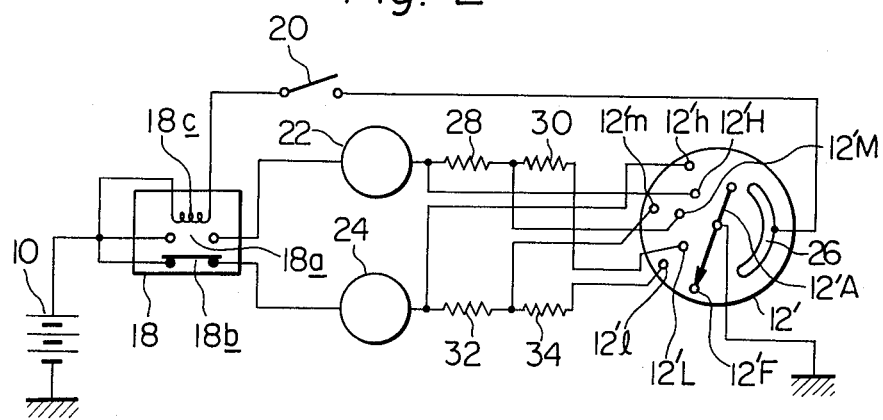
FIG. 2 is a second preferred embodiment of the present invention.
Figure 3:
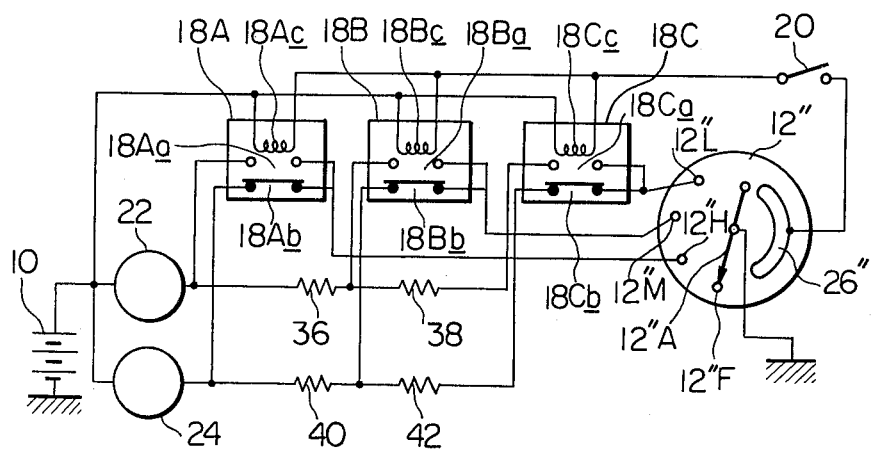
FIG. 3 is a third preferred embodiment of the present invention.

FIGS. 2 and 3 show other improved wiring arrangements in which two series of resistors are arranged so as to exclusively associate with the motors of the air heating and the air cooling device, respectively. These characteristic wiring arrangements are provided for protecting resistors employed therein from overheating during operation. In the case of the first embodiment (FIG. 1), the resistors 14 and 16 for the air heating device originally installed in the vehicle are preferably disposed in a portion of an air duct (not shown) where the resistors 14 and 16 are adequately cooled by the air flow produced by the blower driven by the second motor 24, so that the resistors 14 and 16 are protected from being overheated during the operation of the air heating device. However, if the blower for the air heating device stops producing the air flow in response to the operation of the air cooling device, ore specifically, of the blower driven by the first motor 22, the resistors 14 and 16 are not sufficiently cooled. Accordingly, the resistors 14 and 16 may be subjected to overheating under such conditions.

In FIG. 2, there is illustrated the second preferred embodiment of the present invention. In this embodiment, similar parts are designated by the same numerals as in FIG. 1.

The wiring arrangement of this embodiment comprises a battery 10 having a negative end grounded or connected to, for example, a chassis of the motor vehicle (not shown). An electromagnetic switch 18 having a normally open section 18a, a normally closed section 18b and a solenoid coil 18c is communicated with the battery 10 in such a way that the respective one ends of 18a, 18b and 18c are connected to the positive end of the battery 10. The other ends of 18a, 18b and 18c are connected to one ends of a manual switch 20, a first motor 22 and a second motor 24, respectively, as shown. Communicated with the manual switch 20, the first motor 22 and the second motor 24 is a rotary switch 12' which has a first series of stationary contacts 12'H, 12'M and 12'L, a second series of stationary contacts 12'h, 12'm, and 12'l, a swingable arm supporting contact 12'F, a swingable arm 12'A and an arc-shaped conducting plate 26. The stationary contact 12'h is located in an imaginary straight line passing through both centers of the stationary contact 12'H and a pivot member (no numeral) of the swingable arm 12'A. The other stationary contacts 12'm, 12'M and 12'l, 12'L are also arranged in similar manner to the case of the contacts 12'h and 12'H. The length of the swingable arm 12'A is sufficient enough to accomplish connection between one of the first series of stationary contacts 12'H, 12'M and 12'L and the corresponding one of the second series of stationary contacts 12'h, 12'm and 12'l when the swingable arm 12'A is in the corresponding position. The arc-shaped conducting plate 26 is arranged to be slidingly engageable with one end of the swingable arm 12'A during rotation thereof from the stationary contacts 12'l and 12'L to the stationary contacts 12'h and 12'H. The swingable arm 12'A is grounded. As shown, the stationary contact 12'H is connected to the other end of the first motor 22. First and second resistors 28 and 30 are disposed between the stationary contacts 12'H and 12'M, and between the stationary contacts 12'M and 12'L, respectively. The stationary contact 12'h is connected to the other end of the second motor 24. Third and fourth resistors 32 and 34 are respectively disposed between the contacts 12'h and 12'm, and between the contacts 12'm and 12'l. Now, it should be noted that, in this second embodiment, the resistors 28 and 30 are disposed in an air duct (not shown) at a position where an air flow produced by the blower driven by the first motor 22 strikes against or flows over the resistors 28 and 30 to cool them. If desired, the resistors 28 and 30 may be positioned downstream of an evaporator core of the air cooling device so as to be more effectively cooled. Furthermore, the resistors 32 and 34 should be located in an air duct (not shown) at a position where an air flow produced by the blower driven by the second motor 24 strikes against or flows over the resistors 32 and 34 before reaching to a heater core of the air heating device. The operation of the second embodiment is substantially same as of the first embodiment mentioned before. However, in this case, the resistors during operation are continuously cooled by the air flow produced by the corresponding blowers, so that the unwanted overheating will not occur in these resistors.

The third preferred embodiment illustrated in FIG. 3 is one which can also protect the resistors employed therein from overheating during their operation. In this drawing, the parts carrying the same numerals as of FIG. 1 function the same as in the case of the first embodiment.

The wiring arrangement of the third embodiment comprises a battery 10 having a negative end grounded and a positive end connected to one ends of a first motor 22 and a second motor 24. As described before, the first motor 22 is for the blower of the air cooling device and the second motor 24 is for the blower of the air heating device. A first electromagnetic switch 18A having a normally open section 18Aa, a normally closed section 18Ab and a solenoid coil 18Ac is communicated with the first and second motors 22 and 24 in such a manner that one ends of the normally open section 18Aa and the normally closed section 18Ab are respectively connected to the other ends of the first and second motors 22 and 24, and one end of the coil 18Ac is connected to the positive end of the battery 10. A second electromagnetic switch 18B having a normally open section 18Ba, a normally closed section 18Bb and a solenoid coil 18Bc is also communicated with the first and second motors 22 and 24 in such a way that one ends of the normally open section 18Ba and the normally closed section 18Bb are respectively connected to the other ends of the first and second motors 22 and 24 through respective resistors 36 and 40, and one end of the coil 18Bc is connected to the positive end of the battery 10. A third electromagnetic switch 18C with a normally open section 18Ca, a normally closed section 18Cb and a solenoid coil 18Cc is also communicated with the motors 22 and 24 so that one ends of the normally open section 18Ca and the normally closed section 18Cb are respectively connected to the resistors 36 and 40 through respective resistors 38 and 42, and one end of the coil 18C*c* is connected to the positive end of the battery 10. Communicated with the first, second and third electromagnetic switches 18A, 18B and 18C is a rotary switch 12" which has first, second and third stationary contacts 12"H, 12"M and 12"L, a swingable arm supporter 12"F, a swingable arm 12"A and an arc-shaped conducting plate 26". The first stationary contact 12"H is connected to other ends of the normally open section 18A*a* and the normally closed section 18A*b* of the first electromagnetic switch 18A. The second and third stationary contacts 12"M and 12"L are respectively connected to the second and third electromagnetic switches in the same manner as in the case of the first stationary contact 12"H, as shown. The swingable arm 12"A is grounded, and the other ends of the coils 18A*c*, 18B*c* and 18C*c* are connected to the arc-shaped conducting plate 26" through a manual switch 20. In this embodiment, the resistors 36 and 38 and the resistors 40 and 42 should be disposed in the air ducts for the air cooling device and the air heating device, respectively, in such positions as explained in the description on the second embodiment.

In operation, when the manual switch 20 is open and simultaneously the swingable arm 12"A is brought into contact with one of the first, second and third stationary contacts 12"H, 12"M and 12"L, the second motor 24 for the blower of the air heating device is energized.

Under these conditions, if the manual switch 20 is closed, all the coils 18A*c*, 18B*c* and 18C*c* are energized to allow all the normally open sections 18A*a*, 18B*a* and 18C*a* to close, and simultaneously all the normally closed sections 18A*b*, 18B*b* and 18C*b* to open. Thus, the first motor 22 for the blower of the air cooling device is energized to run, and the second motor 24 for the blower of the air heating device is stopped.

What is claimed is:

1. A wiring arrangement of an air conditioner for a vehicle having an electric power source, comprising:
    a first electric motor for driving a first blower when energized, said first electric motor and said first blower being parts of an air heating device;
    a second electric motor for driving a second blower when energized, said second electric motor and said second blower being parts of an air cooling device;
    voltage controlling means for controlling the magnitude of electric current directed to said first and second motors from said electric power source so as to vary the running speeds of said first and second motors; and
    switching means having first and second states thereof, said first state being a state in which said first electric motor is electrically connected to said electric power source to be energized and simultaneously, said second electric motor is disconnected from said electric power source to be de-energized, said second state being a state in which said first electric motor is disconnected from said electric power source to be de-energized and simultaneously, said second electric motor is connected to said electric power source to be energized.

2. A wiring arrangement as claimed in claim 1, in which said switching means comprising:
    an electromagnetic switch including a normally open section, a normally closed section and a solenoid coil, said normally open section and said normally closed section being closed and open respectively when said solenoid coil is energized; and
    a manual switch for connecting said solenoid coil to said electric power source to allow said solenoid coil to be energized when closed.

3. A wiring arrangement as claimed in claim 2, in which said voltage controlling means comprises:
    a rotary switch including at least two stationary contacts, a swingable arm having a portion pivoted by a pivot member and an end selectively contactable with said stationary contacts; and
    at least one electric resistor disposed between said stationary contacts.

4. A wiring arrangement as claimed in claim 3, in which one of said stationary contacts is connected to said electric power source and said swingable arm is connected through both of said normally open section and said normally closed section of said electromagnetic switch to said first and second motors.

5. A wiring arrangement as claimed in claim 2, in which said voltage control means comprises:
    a rotary switch including a swingable arm having a generally middle portion pivotally supported on a pivot member, a first pair of stationary contacts both of which are directly contacted with an end portion of said swingable arm when said swingable arm is in a first position, a second pair of stationary contacts both of which are directly contacted with said end portion of said swingable arm when said swingable arm is in a second position, and a conducting plate slidingly contacting with the other end portion of said swingable arm when said swingable arm is in and/or between said first and second positions;
    a first electric resistor disposed between one of said first pair of stationary contacts and one of said second pair of stationary contacts; and
    a second electric resistor disposed between the other of said first pair of stationary contacts and the other of said second pair of stationary contacts.

6. A wiring arrangement as claimed in claim 5, in which one of said first pair of stationary contacts is connected through said first electric motor to an end of said normally open section of said electromagnetic switch, one of said second pair of stationary contacts is connected through said second electric motor to an end of said normally closed section of said electromagnetic switch, and said conducting plate is connected through said manual switch to an end of said solenoid coil of said electromagnetic switch, the other ends of said normally open section and said normally closed section and said solenoid coil being connected to said electric power source.

7. A wiring arrangement as claimed in claim 6, in which said first electric resistor is located in a position where an air flow produced by the first blower driven by said first motor strikes against said first electric resistor, further in which said second electric resistor is located in a position where an air flow produced by said second blower driven by said second motor strikes against said second electric resistor before reaching to a heater core of said air heating device.

8. A wiring arrangement as claimed in claim 1, in which said switching means comprises:
    a first electromagnetic switch including a normally open section, a normally closed section and a solenoid coil, said normally open section and said normally closed section being closed and open respectively when said solenoid coil is energized;

a second electromagnetic switch including generally same parts as of said first electromagnetic switch; and a manual switch for connecting said solenoid coils to be energized when closed.

9. A wiring arrangement as claimed in claim 8, in which said voltage control means comprises:

a rotary switch including a swingable arm having a generally middle portion pivoted by a pivot member, at least two stationary contacts to which one end of said swingable arm is selectively contactable, and a conducting plate slidingly contactable with the other end of said swingable arm when said swingable arm contacts with either of said two stationary contacts; and a first electric resistor disposed between one end of said normally open section of said first electromagnetic switch and one end of said normally open section of said second electromagnetic switch, said one end of said normally open section of said first electromagnetic switch being connected through said first electric motor to said electric power source, and the other ends of said normally open section and said normally closed section of said first electromagnetic switch being connected to one of said two stationary contacts; and a second electric resistor disposed between one end of said normally closed section of said first electromagnetic switch and one end of said normally closed section of said second electromagnetic switch, said one end of said normally closed section of said first electromagnetic switch being connected through said second electric motor to said electric power source and the other ends of said normally open section and said normally closed section of said second electromagnetic switch being connected to the other of said stationary contacts.

10. A wiring arrangement as claimed in claim 9, in which said conducting plate is connected through said manual switch to one ends of said solenoid coils of said first and second electromagnetic switches, the other ends of said solenoid coils being connected to said electric power source.

11. A wiring arrangement as claimed in claim 10, in which said first electric resistor is located in a position where an air flow produced by the first blower driven by said first motor of said air cooling device strikes against said first electric resistor, further in which said second electric resistor is located in a position where an air flow produced by said second blower driven by said second motor of said air heating device strikes against said second electric resistor before reaching the heater core of said air heating device.

* * * * *